Jan. 16, 1951 L. L. SNYDER 2,538,281
BACKFLOW PREVENTION APPARATUS
Filed Feb. 16, 1944 2 Sheets-Sheet 1
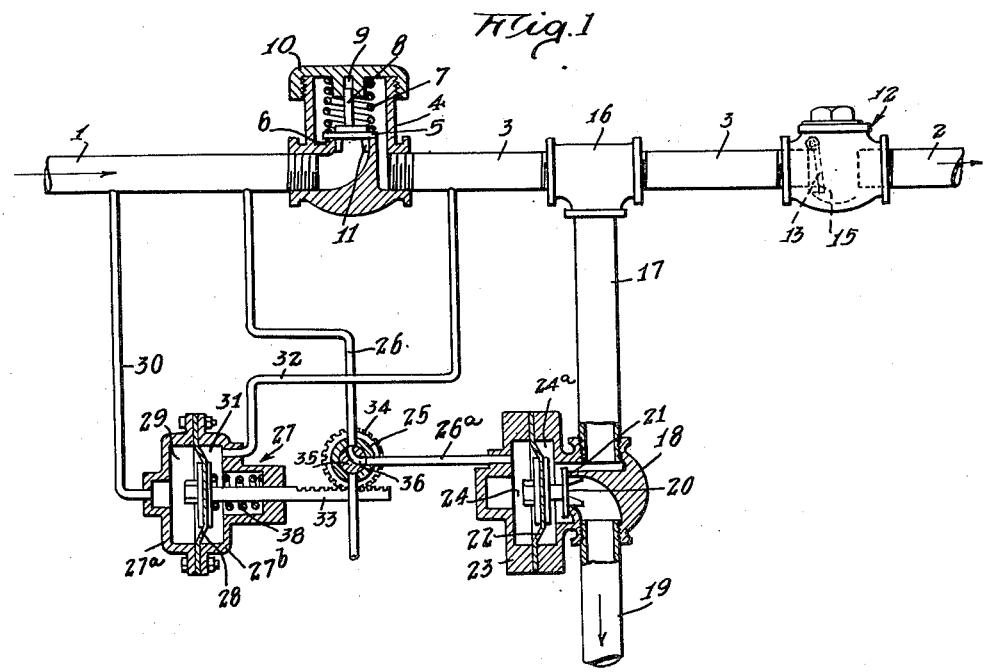
Inventor
Leonard L. Snyder
By
Lyon & Lyon
Attorneys Jan. 16, 1951     L. L. SNYDER     2,538,281
BACKFLOW PREVENTION APPARATUS
Filed Feb. 16, 1944     2 Sheets-Sheet 2

Inventor
Leonard L. Snyder
By Lyon & Lyon
Attorneys

Patented Jan. 16, 1951

2,538,281

UNITED STATES PATENT OFFICE 2,538,281

BACKFLOW PREVENTION APPARATUS

Leonard L. Snyder, Montebello, Calif.

Application February 16, 1944, Serial No. 522,575

9 Claims. (Cl. 137—34.2)

This invention relates to apparatus employed for establishing a unidirectional flow of liquid from a supply source to a point of use and wherein means are provided for preventing reverse flow.

One of the objects of the present invention is to provide apparatus of this character in which a regulator valve is mechanically controlled as differentiated from hydraulic control.

Another object of this invention is to provide a unidirectional flow system in which there is incorporated a mechanically operated differential regulated valve operative to maintain a pressure differential between the supply pressure and the consumer's pressure during normal flow and at cessation of normal flow.

Another object of the invention is to provide improved means for controlling a drain valve, which can be relied upon to effect automatic opening of this valve if the differential pressure referred to falls below a predetermined minimum.

Another object of this invention is to provide in such a supply system a drain valve which will open and remain open as long as the supply pressure is below or slightly above atmospheric pressure.

Further objects of the invention will appear hereinafter.

The invention consists in the novel parts and combinations of parts to be described hereinafter, all of which contribute to produce an efficient back flow prevention apparatus.

In the drawing:

Fig. 1 is an elevation partially in section of apparatus embodying this invention, and illustrating a pilot-valve control device cooperating with the other parts of the apparatus to control the drain valve and effect its automatic opening under conditions where a reversal of the normal direction of flow in the pipe line is imminent or occurring.

Fig. 2 is a view similar to Fig. 1, but illustrating this control apparatus with the pilot-valve control eliminated, so that the control apparatus actuates the drain valve directly.

Figure 3:
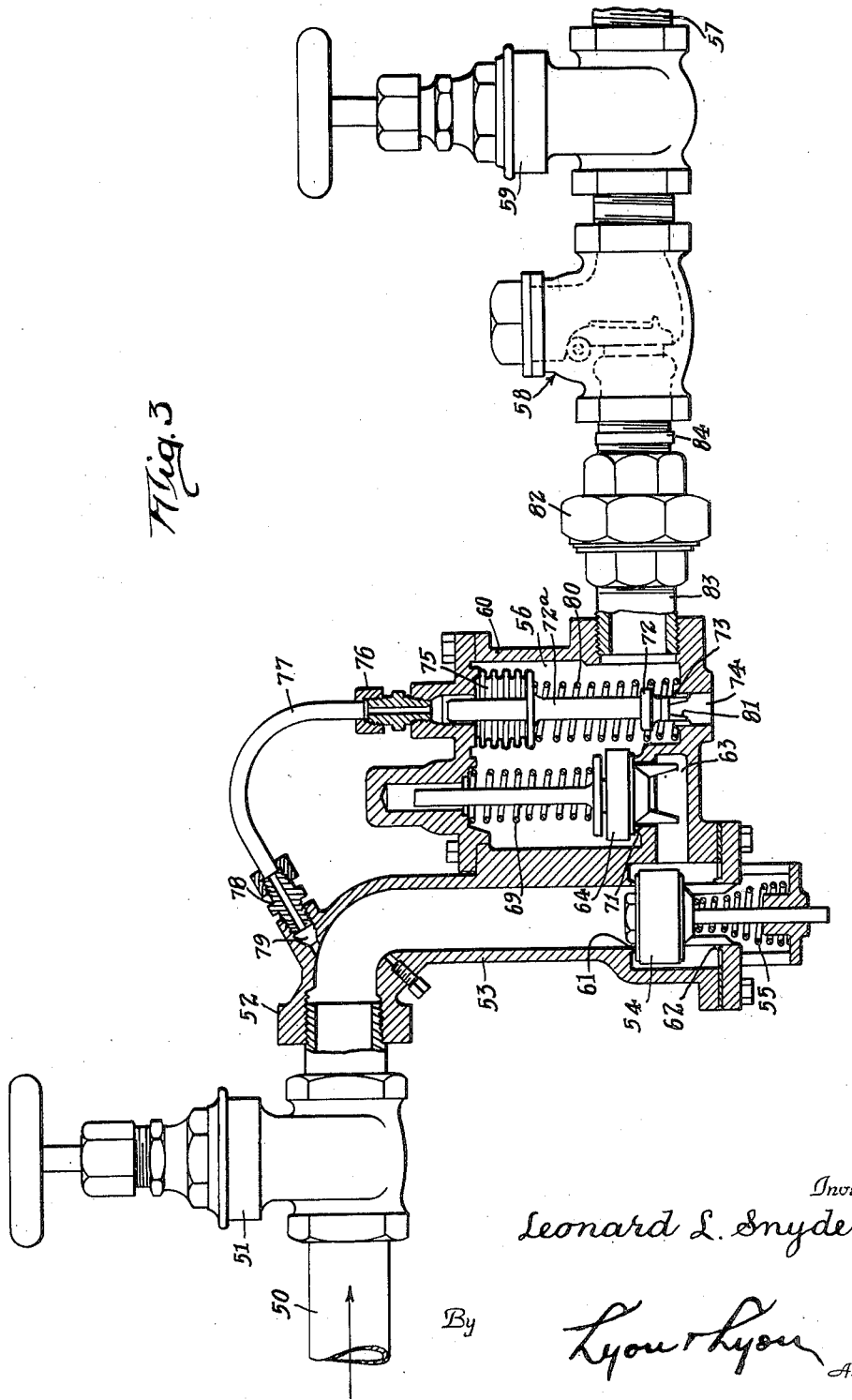
Fig. 3 is a side elevation and partial section illustrating another embodiment of the invention, and in which the drain valve and regulator valve are installed in a casing in which the pressure-controlled chamber is formed and located between the supply line and the consumer's line.

Referring to Fig. 1, 1 indicates the supply line and 2 indicates the consumer's line between which a duct or pipe connection 3 is provided, through which the liquid, such as water, passes, the normal direction of flow being from left to right as indicated by the arrow.

Between the supply line 1 and the intermediate duct or connection 3, I provide a flow control valve 4 which is of poppet type; that is to say, the casing of the valve 4 carries a valve closure 5 that is urged toward its seat 6 through the agency of a coil spring 7. The valve closure 5 is centered and guided through the agency of a valve stem 8 that extends upwardly and is guided in a guide bore 9 formed in the cap 10 of the valve that screws down onto its body. The underside of the valve closure 5 is provided with guide wings 11 that maintain the valve closure centered at its seat.

Between the pipe connection 3 and the consumer's line 2 a check valve 12 is provided, which may be of any type, for example, of the type illustrated including a flap valve or closure 13 supported at its upper side on a substantially horizontal pivot pin and closing upon an inclined seat 15. The system toward which this invention is directed assumes that the check valve 12 is not totally effective in preventing back flow.

The valve 4 operates as the regulator valve for delivering water at a reduced pressure to the consumer's line during normal flow and at cessation of normal flow. There is thus established a pressure differential the magnitude of which depends upon the force of the spring 7. This pressure differential must be of sufficient magnitude to permit the operation of the drain or relief valves to drain or relieve the system should the consumer's line pressure approach the supply line pressure at or within the said differential.

The connection 3 may be provided directly with a drain valve, but in the present instance this is accomplished by employing a T connection 16 from which a downpipe 17 extends, said downpipe being provided with a drain valve 18, the delivery side of which is connected to a pipe 19 that may lead to a drain or to a waste pipe connection. Within the casing of valve 18 a valve closure or disc 20 is provided that normally rests against a seat 21, and the stem of this valve-closure 20 is attached to a movable, pressure-controlled member, such as a diaphragm 22, which is clamped up at its edge between the body of the valve 18 and its cover 23.

On the side toward the valve cover a pressure chamber 24 is formed to which is admitted liquid from the supply line ahead of the valve 4, with respect to the direction of flow. This admission may be direct, as illustrated in Fig. 2, or it may be effected through the agency of a pilot valve 25 as in Fig. 1, which is connected into a pipe 26 that leads off from the supply line 1 adjacent to the inlet side of the valve 4. This pipe 26 includes a section 26ª that leads off from the pilot valve 25 into the chamber 24.

This pilot valve 25 is normally maintained in an open position through the agency of a pressure-controlled device 27 the casing of which is composed of two sections 27ª and 27ᵇ. Within this pressure device a pressure-controlled member such as a diaphragm 28 is provided on one side of which a pressure chamber 29 is formed which is connected by a pipe 30 to the supply line 1 so that the pressure of the said supply line is maintained in this chamber. On the other side of the diaphragm 28 lies a pressure chamber 31 that is connected by the pipe 32 to the intermediate connection 3. Under normal conditions this gives a differential pressure acting on the diaphragm 28, the higher pressure being, of course, in the chamber 29. Hence the diaphragm is normally held displaced toward the right, as viewed in Fig. 1, and in a position to hold a rack 33 that is attached to the diaphragm in an extended or extreme position. In this position the teeth of this rack meshing with a pinion 34 on the plug 35 of the pilot valve hold this plug with its port 36 in a position to maintain communication between the pipe 26 and the pipe 26ª.

Resilient means 38 is provided for urging the diaphragm 28 toward its other extreme position in opposition to the pressure within the chamber 29. The force exerted by the resilient means 38 is supplemented by the pressure of the fluid beyond the flow control valve 4 so that should this pressure rise to a point where its force exerted against the diaphragm 28, plus the force exerted by the spring 38, is greater than the inflow force from the induction line 1 into the chamber 29, the rack 33 will be moved to a position to drain the line 3 between the check valve 12 and flow control valve 4 through the pilot valve 35.

With the organization of parts described above it will be evident that the poppet type valve 4 under normal conditions will maintain a differential pressure between the supply line 1 and the consumer's line 2, the amount of which, of course, will depend upon the strength of the coil spring 7. As the area of the diaphragm exposed in the two chambers 29 and 31 is substantially the same, the preponderance of pressure in the chamber 29 will normally hold the diaphragm in the position shown in Fig. 1, and in this way the pilot valve 25 is maintained open, and the pressure existing in the supply line 1 will also be maintained in the chamber 24, and this pressure is, of course, higher than the pressure existing in the chamber 24ª on the other side of the diaphragm 22. This insures that under normal conditions the valve closure 20 will be held on its seat 21. If, however, an abnormal condition arises, involving a reduction in the amount of this differential pressure below the predetermined minimum, the spring 38, aided or not by pressure in the chamber 31, will move the diaphragm 28 toward the left, thereby operating the rack 33 to move the valve plug 35 to its draining position, in which it will relieve the pressure in the chamber 24, whereupon the valve closure 20 will move away from its seat and permit water in the intermediate chamber or casing 3 to drain off.

The construction disclosed in Fig. 2 is substantially the same as that disclosed in Fig. 1, except that the pilot valve 25 and its operating device is omitted, and the drain valve is biased to open by means of a spring directly associated with it. Referring to Fig. 2, 4ª indicates a poppet type regulator valve which has the same construction as the valve 4 shown in Fig. 1, and 12ª indicates a check valve having the same construction as the check valve 12. Between these valves 4ª and 12ª a pipe connection 3ª, like the chamber 3, is provided, to which a down pipe 17ª is connected, leading to a drain valve 39. The casing of this drain valve 39 is divided in two sections 39ª and 39ᵇ, bolted together so as to enclose a pressure chamber in which pressure controlled means is mounted for assisting in controlling the drain valve closure 40, that is normally held on its seat through the agency of the differential pressure between the supply line 1ª ahead of the valve 4ª, and the pressure existing in the pipe connection or casing 3ª, the pressure of which is communicated down to the interior of the casing of the drain valve directly through the pipe 17ª. This pipe connects up to a port 41 within the valve casing 39, that communicates with the pressure chamber 42 on one side of the diaphragm 43 that is held between the two sections 39ª and 39ᵇ.

The valve closure 40 is provided with a centering stem 44 which is guided at its outer end in the bonnet section 39ª of the valve casing, and guided at its inner end in a bore 45 formed in the adjacent wall of the casing 39; in addition to this, resilient means is provided for biasing this valve toward its open position. In the present instance, this resilient means is a coil spring 46 housed in a cylindrical spring chamber 47 formed in the valve casing 39, and through which the drain water flows when the valve is in its open position. The spring chamber 47 opens on its side into a drain pipe 48 leading to a waste pipe, or to any suitable drain.

With the organization of parts illustrated in Fig. 2, it will be evident that as long as sufficient differential pressure exists between the pressure in the pressure chamber 49 on the left of the diaphragm and the low pressure chamber 42 on the right, the diaphragm 43 will be held over, as illustrated in Fig. 2, so as to hold the valve closure 40 on its seat; but if this differential pressure falls below a predetermined limit, the spring 46 will operate to open the valve 40 and permit the water in the connections 3ª and 17ª to drain out through the drain valve.

Although in Fig. 2 I have illustrated a simple diaphragm for cooperating with the spring 46 to control the functioning of the drain valve 40, it should be understood that any type of pressure controlled device operated by the differential pressure of the supply line and consumer's line could be employed, instead of the diaphragm.

In Fig. 3 I illustrate a construction in which the drain valve is controlled through the agency of a Sylphon or bellows cooperating with a biasing spring exerting its force in a direction to open the drain valve when the differential pressure falls below a predetermined minimum.

In Fig. 3 the direction of flow is from left to right, as in Figs. 1 and 2. The liquid passes from the supply line 50 to a gate valve 51, and thence through an elbow connection 52 which is formed at the upper end of a substantially vertical leg 53 that conducts the incoming liquid down to a check valve 54 that opens in the direction of flow, being normally held on its lower seat 62 by the internal pressure of the liquid. Resilient means, such as a coil spring 55, is provided, urging this valve off its seat 62 and toward its upper seat 61. In Fig. 3 this valve is shown in its closed position, which it would have when the apparatus is functioning to close off, or isolate, the valve chamber 56 from the supply line 50 and consumer's line 57. This position would be assumed whenever the pressure in the supply line 50 reaches atmospheric, or below. The valve chamber 56 and its communicating passages form the intermediate chamber between the valve 64 and a check valve 58 which is interposed in the line of flow and permits liquid to pass through to the delivery gate valve 59.

The valve chamber 56 is illustrated as formed integral within a casing 60 integral with the leg 53 that leads the water in from the elbow 52.

The valve 54 operates to form an air gap and moves to the position indicated in Fig. 3 only in response to the development of atmospheric or sub-atmospheric pressure within the supply line 50, under which conditions the spring 55 acts to move the valve 54 against the seat 61 and to vent the chamber 63 to the atmosphere, preventing back-siphonage of any fluid into the supply line 50.

The main valve 64 is mounted to seat against the seat 71 and to close the passage from the duct 63 under the influence of a spring 69. This valve is in the form of a spring-loaded valve which acts to maintain a differential pressure between the pressure within the chamber 56 and the pressure within the duct 63 under normal flow and at the instant of cessation of flow, between the pressure of the liquid within the chamber 56 and within the supply line 50.

It will be apparent therefore that there is a pressure differential established between the pressure in the supply line 50 and in the consumer's line 57, the pressure in the consumer's line always being below the pressure in the supply line 50 by this differential during normal flow and at the instant of cessation of normal flow.

In order to drain automatically the liquid from the valve chamber 56 under abnormal conditions such as when differential pressure between the supply line 50 and the consumer's line 57 or chamber 56 falls below a predetermined minimum, I provide a drain valve 72 that is normally held on its seat 73 around the edge of a drain opening 74 in the bottom of the casing 60; and this valve is normally held on its seat through the agency of a pressure control device which, in the present instance, is in the form of a Sylphon or bellows 75, the interior of which is in communication with, and normally carries the pressure of, the supply line 50.

To communicate this pressure, I provide a pipe fitting 76 that is attached to the outer end of the Sylphon, and this fitting is connected to a tubular connection 77 which, in the present instance, is in the form of a goose-neck that leads over from a fitting 78 that is connected to a port 79 formed through the wall of the elbow 52. The outside of the Sylphon, of course, is exposed to the pressure of liquid in the intermediate chamber, or valve chamber 56, which pressure is lower than the pressure in the supply line 50 due to the action of the spring loaded valve 64. The Sylphon 75 is secured to the stem 72ª of the valve 72 so that the pressure within the Sylphon acts in a direction to move the drain valve 72 against the seat 73. The action of the pressure inside the Sylphon is opposed by spring 80 and the pressure outside the Sylphon spring 80 is of such strength that under normal operation the pressure differential between pipe 50 and chamber 56 is sufficient to maintain the drain valve 72 closed. However, if the pressure in chamber 56 approaches the pressure in pipe 50 within the limits of the pressure differential, relief valve 72 will start to open and drain the fluid from chamber 56. The foregoing arrangement assures that the drain valve 72 will not open to drain the chamber 56 until the main valve 64 has closed and contrariwise insures that the drain valve 72 will close before the main valve 64 has opened on return of normal flow through the system.

The underside of the valve 72 is provided with guide wings 81 that center this valve with respect to the outlet 74 as the valve moved towards or away from its seat.

The connections between the delivery side of the casing 60 and the check valve 58 may include a coupling 82 in between thimbles or nipples 83 and 84 that connect up to the parts on each side of the coupling.

The operation of the embodiment of my invention illustrated in Figure 3 is: During normal flowing of fluid from the supply line 50 to the consumer's line 57, the vacuum breaker valve 54 is seated upon its seat 62. The main valve 64 is open, compressing the spring 69. The drain valve 72 is closed, compressing the spring 80 and of course the check valve 58 is open as are valves 51 and 59. During normal flow the pressure within the chamber 56 and also within the consumer's line 57 is lower than the pressure within the supply line 50. The spring 69 may be of such force as to maintain a suitable pressure differential. The magnitude of this differential will remain the same irrespective of the pressure fluctuations within the supply line 50 so that say there was 100 lbs. pressure in the supply line 50, and the spring 69 exerted a force sufficient to reduce the pressure 20 lbs., the pressure within the chamber 56 would be 80 lbs. and would be less than 80 lbs. in the consumer's line 57. As the full pressure of 100 lbs. is exerted through the bellows 75 against the spring 80, the drain valve 72 would be maintained tightly closed. At the instant of cessation of flow, the pressure in the chamber 56 would build up to 80 lbs., at which time the main valve 64 would close and remain closed.

Under this condition, the drain valve 72 would also remain closed and the vacuum breaker valve 54 would remain upon its seat 62. If a condition existed in the consumer's line 57 which would otherwise result in a condition of backflow as by the pressure in the consumer's line building up or rising to a point where the pressure in the chamber 56 was greater than 80 lbs., and assuming that this occurred during a condition of normal flow, the main valve 64 would first close and as the pressure built up to overcome the force of the pressure exerted within the bellows 75, this pressure would act on the outside of the bellows in conjunction with the spring 80 to open the drain valve and drain the chamber 56, maintaining this condition of drain until the pressure in the consumer's line again fell below the pressure differential, at which time the drain valve 72 would close. If, on the other hand, the condition of back-siphonage developed in the supply line 50 which would reduce the supply line pressure so that the difference in the pressure within the supply line 50 and within the consumer's line 57 was less than the assumed differential of 20 lbs. the same action would take place, that is, of first closing the main valve 64 and then opening the relief valve 72 to drain the chamber 56. If the pressure in the supply line 50 fell to atmospheric pressure or below due to the development of a partial vacuum in the supply line 50, the vacuum breaker valve 54 would move from its position in engagement with the seat 62 to the position of engagement with the seat 61, thereby opening the chamber 63 to the atmosphere. When the pressure again built up within the supply line 50 so that backflow would not occur, the vacuum breaker valve 54 would again move to its closed position within the seat 62 and the pressure would build up within the chamber 63 and in the bellows 75 until the main valve 64 opened. The opening of the main valve 64 would, however, not occur until the drain valve 72 had closed due to the difference in effective forces exerted by the springs 69 and 80.

It will be observed that if for any reason a leak developed in the bellows 75, that this leakage would occur into the chamber 56 with the result that the pressure within this chamber 56 was built up causing the drain valve 72 to open under the influence of the spring 80 draining the chamber 56. However, as this pressure builds up within the chamber 56, the main valve 64 would close. As the drain valve 72 continues to leak, it would give evidence immediately of the fact that the bellows had ruptured. The same result would follow from a leaking main valve 64.

Many other embodiments of this invention may be resorted to without departing from the spirit of the invention.

I claim:

1. In a backflow prevention device for preventing back siphoning or back flow in a pipe system through which a liquid flows from a source to a consumer's line, the combination of a chamber member positioned in the pipe system, a flow control valve within the chamber member, spring means for spring loading the control valve to a closed position, the control valve being mounted in the chamber member to open in the direction of normal flow therethrough, a drain valve for draining the chamber, said spring means being adapted to exert a predetermined force to move the flow control valve to its closed position whereby a definite drop in pressure is established within the chamber device during normal flow and at the instant of cessation of flow, pressure actuated means for opening and closing the drain valve, and additional means responsive to the pressure differential across the flow control valve adapted to energize the said pressure actuated means.

2. In apparatus for preventing backflow, or siphoning from a consumer's line back to a supply line, the combination of a duct between said lines, having a drain outlet with a drain-valve for closing the same; a pressure-controlled device having means for opposing to each other the pressure existing in the supply line and the pressure in the consumer's line, pressure operated means for actuating the drain valve including a pilot valve controlled by said pressure controlled device, means including a spring for biasing the drain-valve toward an open position; a poppet-type pressure-regulator valve having a valve-seat and a valve-closure cooperating therewith and opening toward the consumer's line, for maintaining a regulated pressure in the consumer's line lower than that in the supply line; resilient means for urging the valve-closure to its closed position and cooperating with the internal pressure of the liquid on the faces of said closure to determine the position of said closure with relation to said seat; and a check-valve between the drain-valve and the consumer's line; all of said parts cooperating to drain the duct by opening the drain valve and closing the poppet type valve when the pressure within the duct approaches the pressure in the supply line within the pressure drop determined by the resilient means biasing the poppet type valve.

3. Means for preventing siphoning or backflow in a pipe system, in which liquid flows from a supply source to a consumer's line, the combination of a duct between the supply source and the consumer's line, a check-valve between the duct and the consumer's line opening in the direction of normal flow toward the consumer's line, a check and flow control valve between the said supply source and said duct, a drain-valve having open and closed positions and connected with said duct between the said check-valves, including a closure, a pressure chamber with a pressure-controlled member connected with the said closure, a pilot valve operable in one position to vent said pressure chamber to atmosphere and operable in another position to admit liquid under pressure to said pressure chamber for normally holding the drain-valve closed, a second pressure chamber with its pressure-controlled member connected to said pilot valve, a connection to said second-named pressure chamber from the supply source on one side of its pressure-controlled member, a connection to the other side of the same in said second-named pressure chamber from said duct, and a spring associated with said second-named pressure-controlled member for urging the pilot valve toward its position for venting the first-named pressure chamber when the degree of pressure in said duct approaches the degree of pressure in said supply source.

4. In a backflow prevention device for preventing back-siphoning or backflow in a pipe system through which a liquid flows from a source to a point of use, the combination of a chamber member in the pipe system, a flow control valve operatively connected with the chamber member, spring means normally biasing the control valve to a closed position to provide a predetermined pressure drop in the chamber member, the control valve opening in the direction of flow through the chamber member, a drain valve for draining the chamber member, a pilot member operatively connected with the drain valve including fluid pressure actuating means operable when the pressure within the chamber member approaches pressure in the pipe system ahead of the chamber member within the pressure drop for actuating the drain valve to open position to drain liquid from the chamber member.

5. Means for preventing siphoning or backflow in a pipe system in which flow of liquid is normally maintained from a supply source to a consumer's line, including a duct between the supply source and the consumer's line, a check valve between the duct and the consumer's line opening in the direction of normal flow toward the consumer's line; a flow control valve between the said supply source and said duct, said flow control valve having a valve seat and a spring-loaded valve closure mounted to move away from said seat in the said direction of normal flow; a drain-valve for draining said duct; means including the pilot valve for operating the drain valve; a differential pressure-controlled means subjected to the pressure of the liquid in the duct and the pressure of said supply source, for normally maintaining said pilot valve in one position during normal flow, and thereby maintain the drain valve closed, a spring exerting its force in a direction to effect the opening of the drainvalve; all of said parts cooperating to drain the duct by opening the drain valve and closing said flow control valve when the pressure within the duct approaches the pressure in the supply source within the pressure drop determined by the flow control valve.

6. Means for preventing siphoning or backflow in a pipe system, in which liquid flows from a supply source to a consumer's line, the combination of a duct between the supply source and the consumer's line, a check-valve between the duct and the consumer's line opening in the direction of normal flow toward the consumer's line, a flow control valve between the said supply source and said duct, spring means biasing the flow control valve to closed position to maintain a predetermined pressure drop in the liquid passing said flow control valve, a drain-valve connected with said duct between the flow control valve and said check-valve, including a closure element, a pressure chamber with a pressure-controlled member connected with the said closure element, a pressure supply means for normally supplying liquid under pressure to said pressure-chamber for holding the drain-valve closed, and automatic means brought into operation through the agency of the difference of pressure of the liquid supply upstream from said flow control valve and downstream from said flow control valve when the said difference in pressure is less than the pressure difference established by the pressure drop determined by the spring biasing means for the flow control valve adapted to cut off said communication and to relieve said pressure-controlled member so as to permit the drain-valve to open and drain said duct.

7. A back flow prevention device for use in a fluid distribution system having an induction line and an eduction line connected by an intermediate chamber through which fluid flows under pressure, in combination with means for producing under normal flow and at cessation of normal flow a substantial pressure drop between the induction and the eduction lines, a drain valve for draining the intermediate chamber, a pilot valve connected with and adapted in one position to effect closing of the drain valve, pressure responsive means adapted to actuate the pilot valve, said means including a movable element subjected to one side to the induction pressure and on the other side to the eduction pressure, resilient means biasing the movable element in a direction to shift the pilot valve to another position whereby opening the drain valve is permitted, said resilient means being normally overcome by the normal preponderance of pressure of the induction line over the eduction line, the resilient means being effective to open the drain valve in the event that the degree of said preponderance of induction line pressure should be reduced below a predetermined value.

8. A back flow prevention device for use in a fluid distribution system having an induction line and an eduction line connected by an intermediate chamber through which fluid flows under pressure, in combination with means for producing under normal flow and at cessation of normal flow a substantial pressure drop between the induction and the eduction lines, a drain valve for draining the intermediate chamber, a pilot valve connected with and controlling the opening and closing of the drain valve, pressure responsive means including a movable element adapted to actuate the pilot valve, resilient means biasing the movable element in a direction to open the drain valve, the movable element being urged in the same direction by a first force proportional to the eduction pressure and urged in the other direction by a second force proportional to the induction pressure, said resilient means being normally overcome by the normal preponderance of pressure of the induction line over the eduction line, the resilient means being effective to open the drain valve in the event that the degree of said preponderance of induction line pressure should be reduced below a predetermined value.

9. Means for preventing siphoning or backflow in a pipe system, in which liquid flows from a supply source to a consumer's line, the combination of a duct between the supply source and the consumer's line, a check-valve between the duct and the consumer's line opening in the direction of normal flow toward the consumer's line, a check valve and flow control valve between the said supply source and said duct, a drain-valve connected with said duct between the said check valve and the flow control valve, including a closure, a pressure chamber with a pressure-controlled member operatively connected to actuate the said closure, means for admitting liquid under pressure to said pressure chamber on one side of said pressure-controlled member so that the pressure on said pressure-controlled member urges the closure of said drain-valve toward its closed position, said means including a pilot valve and means responsive to the pressure differential across said flow control valve for actuating the pilot valve, means for admitting liquid under pressure from said duct to the other side of said pressure-controlled member so that the differential between said pressures on said pressure-controlled member holds the valve-closure in its closed position, and a spring opposing the differential pressure for urging the valve closure to its open position, all of said parts cooperating when the degree of pressure in the duct approaches the pressure in the supply source, to actuate said pressure-controlled member to open said drain-valve.

LEONARD L. SNYDER.

REFERENCES CITED

The following references are of record in the file of this patent:

UNITED STATES PATENTS

| Number | Name | Date |
|---|---|---|
| 1,105,991 | Miller | Aug. 4, 1914 |
| 1,274,680 | Calvert | Aug. 6, 1918 |
| 1,627,628 | Anderson | May 10, 1927 |
| 1,960,144 | Entriken | May 22, 1934 |
| 2,146,204 | Dore | Feb. 7, 1939 |
| 2,310,586 | Lohman | Feb. 9, 1943 |
| 2,328,118 | Ahlport | Aug. 31, 1943 |